(12) United States Patent
Koo et al.

(10) Patent No.: US 11,567,367 B2
(45) Date of Patent: Jan. 31, 2023

(54) COLOR CONVERSION PANEL AND DISPLAY DEVICE INCLUDING THE SAME

(71) Applicant: SAMSUNG DISPLAY CO., LTD., Yongin-si (KR)

(72) Inventors: Ja Hun Koo, Asan-si (KR); Kyung-Hun Lee, Yongin-si (KR); Tae-Jong Jun, Suwon-si (KR); Woo-Young Cheon, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/651,162

(22) Filed: Feb. 15, 2022

(65) Prior Publication Data

US 2022/0171240 A1    Jun. 2, 2022

Related U.S. Application Data

(63) Continuation of application No. 17/121,207, filed on Dec. 14, 2020, now Pat. No. 11,269,217, which is a (Continued)

(30) Foreign Application Priority Data

Aug. 1, 2017   (KR) ........................ 10-2017-0097724

(51) Int. Cl.
*G02F 1/1335*   (2006.01)
*G02F 1/1333*   (2006.01)
(Continued)

(52) U.S. Cl.
CPC ...... *G02F 1/133617* (2013.01); *G02F 1/1368* (2013.01); *G02F 1/133504* (2013.01); (Continued)

(58) Field of Classification Search
CPC ............ G02F 1/1333; G02F 1/133302; G02F 1/133305; G02F 1/133345; G02F 1/1335; (Continued)

(56) References Cited

U.S. PATENT DOCUMENTS 9,293,091 B2    3/2016   Lee et al.
9,528,685 B2   12/2016   Kadowaki
(Continued)

FOREIGN PATENT DOCUMENTS

CN    101169540    4/2008
CN    103278961    9/2013
(Continued)

*Primary Examiner* — Thoi V Duong
(74) *Attorney, Agent, or Firm* — F. Chau & Associates, LLC (57) ABSTRACT

A color conversion display panel includes a substrate. A color conversion portion is disposed on the substrate. The color conversion portion includes a semiconductor nanocrystal. A transmission portion is disposed on the substrate. A blue light blocking filter is disposed between the substrate and the color conversion portion. The blue light blocking filter includes a first convex portion that protrudes toward the substrate. The transmission portion includes a first region including a scatterer and a second region including a second convex portion that protrudes toward the substrate.

21 Claims, 7 Drawing Sheets

Related U.S. Application Data continuation of application No. 16/541,282, filed on Aug. 15, 2019, now Pat. No. 10,877,318, which is a continuation of application No. 15/870,053, filed on Jan. 12, 2018, now Pat. No. 10,409,110.

(51) Int. Cl.
*G02F 1/13357* (2006.01)
*G02F 1/1368* (2006.01)

(52) U.S. Cl.
CPC .. *G02F 1/133509* (2013.01); *G02F 1/133514* (2013.01); *G02F 1/133526* (2013.01); *G02F 1/133528* (2013.01); *G02F 1/133614* (2021.01); *G02F 1/133621* (2013.01); *G02F 2202/36* (2013.01)

(58) Field of Classification Search
CPC ......... G02F 1/133512; G02F 1/133514; G02F 1/133504; G02F 1/133509; G02F 1/133526; G02F 1/133528; G02F 1/133617; G02F 1/133614; G02F 1/133621; G02F 1/1362; G02F 1/1368; G02F 2202/36
See application file for complete search history.

(56) References Cited

U.S. PATENT DOCUMENTS

| | | | |
|---|---|---|---|
| 9,897,865 | B2 | 2/2018 | Yang et al. |
| 10,101,612 | B2 | 12/2018 | Im et al. |
| 10,409,110 | B2 | 9/2019 | Koo et al. |
| 10,877,318 | B2 | 12/2020 | Koo et al. |
| 2015/0205159 | A1 | 7/2015 | Itou et al. |
| 2015/0226232 | A1 | 8/2015 | Lee et al. |
| 2016/0062870 | A1 | 3/2016 | Menahem |
| 2017/0102579 | A1 | 4/2017 | Wang |
| 2019/0041700 | A1 | 2/2019 | Koo et al. |
| 2019/0369445 | A1 | 12/2019 | Koo et al. |
| 2021/0132445 | A1 | 5/2021 | Koo et al. |

FOREIGN PATENT DOCUMENTS

| | | |
|---|---|---|
| CN | 103913886 | 7/2014 |
| CN | 104330918 | 2/2015 |
| CN | 104793392 | 7/2015 |
| JP | 2015-138123 | 7/2015 |
| JP | 2016-224434 | 12/2016 |
| KR | 100668297 | 3/2006 |
| KR | 20070059464 | 5/2007 |
| KR | 1020090117094 | 11/2009 |
| KR | 10-2015-0094847 | 8/2016 |
| KR | 1020160128257 | 11/2016 |
| KR | 1020170014755 | 2/2017 |
| KR | 10-2017-0043724 | 4/2017 |

COLOR CONVERSION PANEL AND DISPLAY DEVICE INCLUDING THE SAME

CROSS-REFERENCE TO RELATED APPLICATION

This application is a Continuation of co-pending U.S. patent application Ser. No. 17/121,207, filed on Dec. 14, 2020, which is a Continuation of U.S. patent application Ser. No. 16/541,282, filed on Aug. 15, 2019, which is a Continuation of U.S. patent application Ser. No. 15/870,053, filed on Jan. 12, 2018, which claims priority to and the benefit of Korean Patent Application No. 10-2017-0097724 filed in the Korean Intellectual Property Office on Aug. 1, 2017, the entire contents of which are herein incorporated by reference.

TECHNICAL FIELD

The present disclosure relates to a display device and, more specifically, to a color conversion display panel and a display device including the same.

DISCUSSION OF THE RELATED ART

A liquid crystal display device may include two field generating electrodes, a liquid crystal layer, a color filter, and a polarization layer. Light emitted from a light source reaches a viewer through the liquid crystal layer, the color filter, and the polarization layer. Light loss may occur in the polarizing layer, the color filter, or the other various layers of the display device. Similarly, light loss may occur in other forms of display devices such as an organic light emitting diode display.

Some forms of display devices include a color conversion display panel. Color conversion display panels may use semiconductor nanocrystals, such as quantum dots, to provide the display device with high color reproducibility and reduced light loss generated in a polarization layer or a color filter.

SUMMARY

A color conversion display panel includes a substrate. A color conversion portion is disposed on the substrate. The color conversion portion includes a semiconductor nanocrystal. A transmission portion is disposed on the substrate. A blue light blocking filter is disposed between the substrate and the color conversion portion. The blue light blocking filter includes a first convex portion that protrudes toward the substrate. The transmission portion includes a first region including a scatterer and a second region including a second convex portion that protrudes toward the substrate.

A color conversion display panel includes a substrate having a first surface and a second surface opposite to the first surface. A color conversion portion is disposed on the first surface of the substrate. The color conversion portion includes a semiconductor nanocrystal. A transmission portion is disposed on the first surface of the substrate. The substrate includes a plurality of convex portions in the second surface.

A display device includes a lower display panel including a plurality of thin film transistors. A color conversion display panel at least partially overlaps the lower display panel. A liquid crystal layer is disposed between the lower display panel and the color conversion display panel. The color conversion display panel includes a substrate. A color conversion portion including a semiconductor nanocrystal is disposed between the substrate and the liquid crystal layer. A transmission portion is disposed between the substrate and the liquid crystal layer. A blue light blocking filter is disposed between the substrate and the color conversion portion, and includes a convex portion that protrudes toward the substrate. The transmission portion includes a first region including a first scatterer and a second region including a second scatterer and a convex portion that protrudes toward the substrate. A volume fraction of the first scatterer included in the first region is greater than a volume fraction of the second scatterer included in the second region.

A display device includes a lower display panel including a plurality of thin film transistors. A color conversion display panel at least partially overlaps the lower display panel. A liquid crystal layer is disposed between the lower display panel and the color conversion display panel. The color conversion display panel includes a substrate. A color conversion portion including a semiconductor nanocrystal is disposed between the substrate and the liquid crystal layer. A transmission portion is disposed between the substrate and the liquid crystal layer. A blue light blocking filter is disposed between the substrate and the color conversion portion, and includes a convex portion that protrudes toward the substrate. The transmission portion includes a first region including a scatterer and a second region including a convex portion that protrudes toward the substrate. The second region does not include the scatterer.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE EMBODIMENTS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

In the figures and the description thereof, like numerals may refer to like or similar elements.

In the drawings, the size and thickness of layers, films, panels, regions, etc., may be exaggerated for clarity.

It will be understood that when an element such as a layer, film, region, or substrate is referred to as being "on" another element, it can be directly on the other element or intervening elements may also be present.

Further, in the specification, the phrase "in a plan view" may mean that an object portion is viewed from above, and the phrase "in a cross-section" may mean that an object is viewed from a side though by vertically cutting the object.

Figure 1:
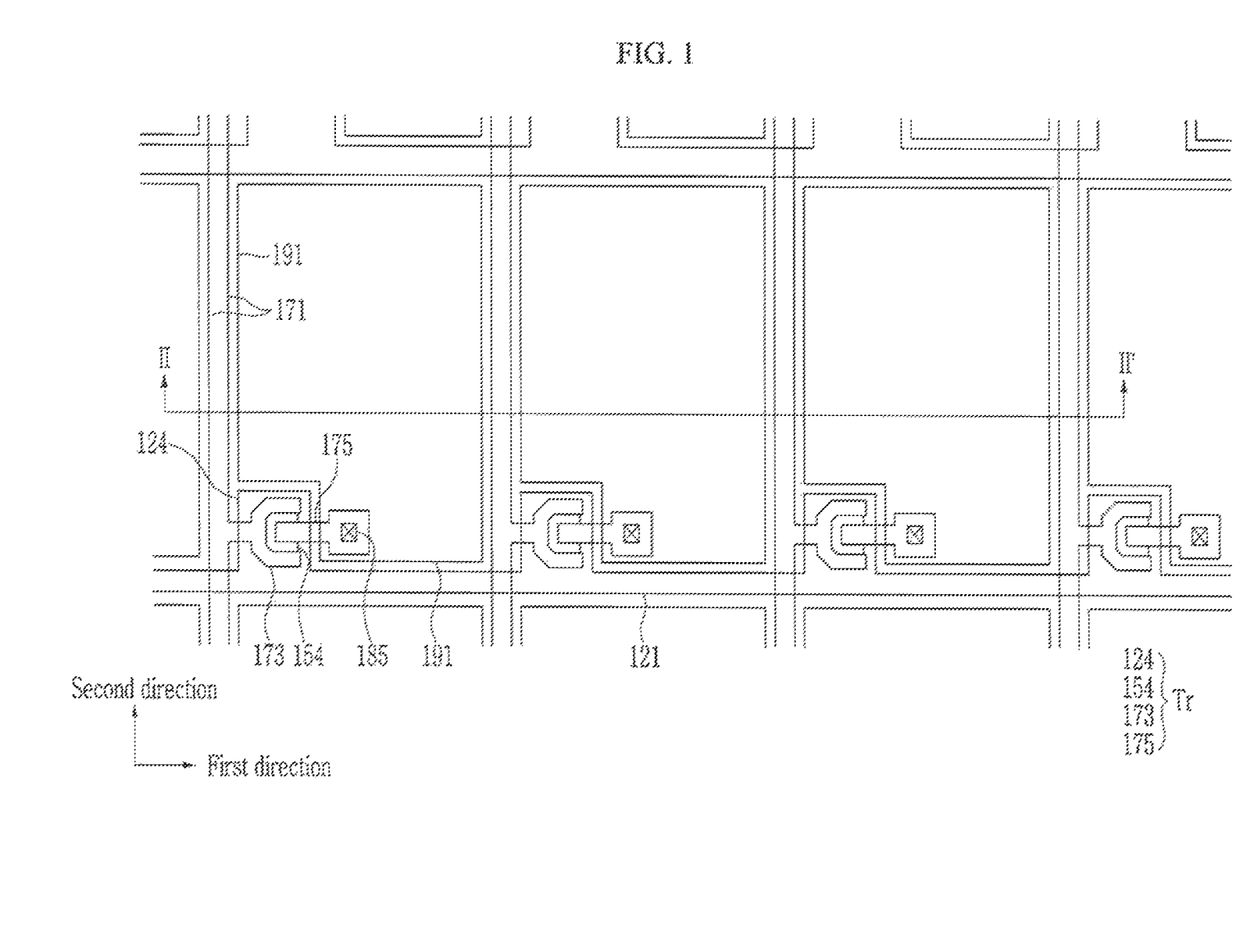
FIG. 1 is a top plan view illustrating pixels of a display device according to an exemplary embodiment of the present invention.
Figure 2:
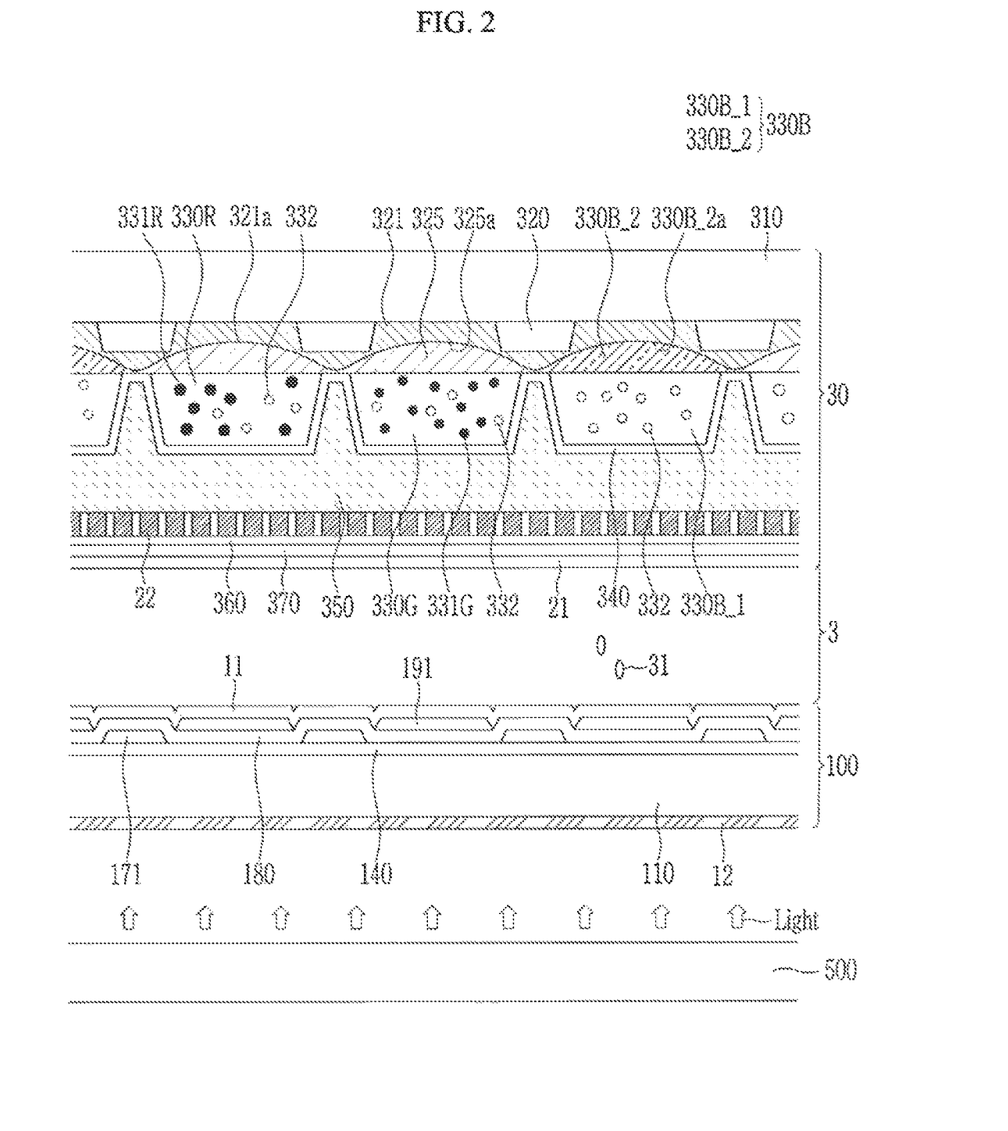
FIG. 2 is a cross-sectional view taken along a line 11-11' of FIG. 1 according to an exemplary embodiment of the present invention.

Hereinafter, a color conversion display panel and a display device including the same, in accordance with an exemplary embodiment of the present invention, will be described with reference to FIG. 1 and FIG. 2. FIG. 1 is a top plan view illustrating pixels of a display device according to an exemplary embodiment of the present invention, and FIG. 2 is a cross-sectional view taken along a line II-II' of FIG. 1.

The display device, according to an exemplary embodiment of the present invention, may include a light unit 500 (e.g. a backlight), a lower display panel 100, a color conversion display panel 30, and a liquid crystal layer 3 disposed between the lower display panel 100 and the color conversion display panel 30.

The light unit 500 may include a light source for generating light having a first wavelength, and a light guide for receiving the light generated from the light source and guiding the light towards the lower display panel 100 and the color conversion display panel 30. The first wavelength may be in a range of about 400 nm to about 500 nm, or may be in a range of about 420 nm to about 480 nm. The light source may emit blue light. For example, the light source may be a blue light emitting diode (LED).

A light unit including a white light source or an ultraviolet light source may be used instead of the light unit 500 including the above-described blue light source. Hereinafter, the display device using the light unit 500 including the blue light source will be described.

The lower display panel 100 includes a plurality of transistors, and the lower display panel 100 at least partially overlaps the color conversion display panel 30. The liquid crystal layer 3 includes a plurality of liquid crystal molecules 31.

According to an exemplary embodiment of the present invention, the display device may include a first polarization layer 12 disposed between a first substrate 110 and the light unit 500. The first polarization layer 12 may linearly polarize the light generated in the light unit 500.

A coated polarization layer, a film polarization layer, a wire grid polarizer, or the like may be used as the first polarization layer 12. The first polarization layer 12 may be disposed on a surface of the first substrate 110 in various ways, for example, by being attached as a film, formed as a coating, or formed through printing.

The lower display panel 100 includes a gate line 121 that extends in a first direction. The lower display panel 100 further includes a gate electrode 124, a gate insulating layer 140 disposed on the gate line 121, and a semiconductor layer 154 disposed on the gate insulating layer 140. A data line 171 is disposed on the gate insulating layer 140. The data line 171 extends in a second direction and is connected with a source electrode 173. A drain electrode 175 is disposed in a same layer as the source electrode 173. A passivation layer 180 is disposed on the data line 171 and the drain electrode 175.

The semiconductor layer 154 is disposed on the gate electrode 124 and may include a channel between the source electrode 173 and the drain electrode 175. The gate electrode 124, the semiconductor layer 154, the source electrode 173, and the drain electrode 175 may together constitute one transistor Tr.

A pixel electrode 191 and a first alignment layer 11 are sequentially disposed on the passivation layer 180. The pixel electrode 191 is electrically connected to the drain electrode 175 through a contact hole 185 of the passivation layer 180.

The pixel electrode 191 may be disposed in a matrix form, and the pixel electrode 191 may have various shapes. Although the pixel electrode 191 is illustrated as having a planar shape, the pixel electrode 191 may have other shapes such as a slit-shaped pixel electrode.

The color conversion display panel 30 includes a second substrate 310 that at least partially overlaps the first substrate 110. A light blocking member 320 may be disposed between the second substrate 310 and the lower display panel 100.

The light blocking member 320 is disposed between a first color conversion portion 330R and a second color conversion portion 330G, between the second color conversion portion 330G and a transmission portion 330B, and between the transmission portion 330B and the first color conversion portion 330. The light blocking member 320 may define a region in which the first color conversion portion 330R, the second color conversion portion 330G, and the transmission portion 330B are disposed.

The light blocking member 320 may include a material that absorbs incident light or a material that reflects light. For example, a light blocking member 320 including a metal material may increase light transmission efficiency by reflecting light introduced from the first color conversion portion 330R, the second color conversion portion 330G, and the transmission portion 330B toward the first color conversion portion 330R, the second color conversion portion 330G, and the transmission portion 330B, respectively.

A first passivation layer 321 may be disposed between the light blocking member 320 and the color conversion portions 330R and 330G, and between the light blocking member 320 and the transmission portion 330B. The first passivation layer 321 may at least partially overlap a front surface of the second substrate 310.

The first passivation layer 321 may include a material having a lower refractive index than those of the second substrate 310, the blue light blocking filter 325, and the transmission portion 330B. For example, the refractive index of the second substrate 310 may be about 1.5, and the refractive indexes of the transmission portion 330B and the blue light blocking filter 325 may each be about 1.7. According to an exemplary embodiment of the present invention, the refractive index of the first passivation layer 321 may be about 1.2.

The first passivation layer 321 may have a surface that faces the liquid crystal layer 3, and the surface may include a plurality of recess portions 321a. The recess portions 321a may be regularly arranged at a constant distance.

According to an exemplary embodiment of the present invention, one recess portion 321a may be positioned to at least partially overlap one pixel, but the present specification is not limited thereto. In addition, recess portions 321a disposed adjacently may either be connected to each other, or may be spaced apart from each other. The recess portions 321a may have a constant curvature, such as a semi sphere, as is illustrated herein, or the recess portions 321a may have an irregular curvature.

In general, where a light is introduced from a first material having a relatively large refractive index into a second material having a relatively small refractive index, the light may be totally reflected at an interface between the first material and the second material when an incidence angle of the light is greater than a particular angle. Light passing through the transmission portion 330B or the blue light blocking filter 325 is introduced into the first passivation layer 321. In this case, the transmission portion 330B or the blue light blocking filter 325 has a refractive index that is greater than that of the first passivation layer 321. Accordingly, total reflection may occur for light that is introduced at a critical angle, as a minimum.

According to exemplary embodiments of the present invention, the first passivation layer 321 includes the recess portions 321a at the interface. The recess portions 321a may vary an incidence angle of light introduced to the interface to reduce total reflection occurring at the interface. Since an amount of light emitted to the outside of the second substrate 310 increases as the total reflection decreases, light-emitting efficiency of the display device may increase.

A blue light blocking filter 325 may be disposed between the first passivation layer 321 and the first color conversion portion 330R, and between the first passivation layer 321 and the second color conversion portion 330G. The blue light blocking filter 325 may be disposed only in regions for emitting red and green light and not in a region for emitting blue light.

The blue light blocking filter 325 may include a plurality of convex portions 325a which face the second substrate 310. The convex portions 325a may be regularly arranged at a constant distance.

The convex portion 325a of the blue light blocking filter 325 and the recess portion 321a of the first passivation layer 321 may have complementary shapes. The present specification has described the exemplary embodiment in which the blue light blocking filter 325 includes the convex portion 325a. However, a shape of the convex portion 325a included in the blue light blocking filter 325 may be changed depending on a shape of the recess portion 321a included in the first passivation layer 321.

Similar to the recess portions 321a, one convex portion 325a may be disposed to correspond to one pixel. In addition, the convex portions 325a disposed adjacently may be connected to each other, or may be spaced apart from each other. Further, although the present specification has described the convex portions 325a having a constant curvature, the convex portions 325a may have an irregular curvature.

The blue light blocking filter 325 may block or absorb blue light emitted from the light unit 500. Blue light from the light unit 500 is converted into red or green light by a semiconductor nanocrystal. In this case, some of the blue light may be emitted through the second substrate 310 without being converted. The blue light blocking filter 325 may have a single-layer structure or a stacked structure of a plurality of layers to prevent the emission of unconverted blue light.

The blue light blocking filter 325 may include any material for performing the above-mentioned effects, and may include a yellow color filter as an example. A refractive index of the blue light blocking filter 325 including the yellow color filter may be about 1.7, and it may have a refractive index that is greater than that of the first passivation layer 321.

Light is totally reflected at an interface between the blue light blocking filter 325 having a large refractive index and the first passivation layer 321 having a small refractive index when an incidence angle is greater than a certain angle in a case where the light is introduced from the blue light blocking filter 325 into the first passivation layer 321. However, the color conversion display panel 30, according to an exemplary embodiment of the present invention, may include an irregular pattern formed between the first passivation layer 321 and the blue light blocking filter 325, thereby changing an incidence angle of light to reduce the total reflection occurring at the interface.

The first color conversion portion 330R and the second color conversion portion 330G may be disposed between the blue light blocking filter 325 and the liquid crystal layer 3, and the transmission portion 330B including a first region 330B_1 and a second region 330B_2 may be disposed between the second substrate 310 and the lower display panel 100.

The first color conversion portion 330R may include a first semiconductor nanocrystal 331R. The second color conversion portion 330G may include a second semiconductor nanocrystal 331G. Light introduced into the first color conversion portion 330R may be converted into red light by the first semiconductor nanocrystal 331R, and may then be emitted from the first color conversion portion 330R. Light introduced into the second color conversion portion 330G may be converted into green light by the second semiconductor nanocrystal 331G, and may then be emitted from the second color conversion portion 330G.

The first semiconductor nanocrystal 331R may include a red phosphor and/or a red quantum dot for converting the introduced blue light into red light. The second semiconductor nanocrystal 331G may include a green phosphor and/or a green quantum dot for converting the introduced blue light into green light.

The red quantum dot and the green quantum dot may be selected from a group II-VI compound, a group III-V compound, a group IV-VI compound, a group IV element, a group IV compound, and a combination thereof.

For the group II-VI compound, a binary compound selected from CdSe, CdTe, ZnS, ZnSe, ZnTe, ZnO, HgS, HgSe, HgTe, MgSe, MgS, and a mixture thereof; a ternary compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; or a quaternary compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof, may be employed. For the group III-V compound, a binary compound selected from GaN, GaP, GaAs, GaSb, AlN, AlP, AlAs, AlSb, InN, InP, InAs, InSb, and a mixture thereof; a ternary compound selected from GaNP, GaNAs, GaNSb, GaPAs, GaPSb, AlNP, AlNAs, AlNSb, AlPAs, AlPSb, InNP, InNAs, InNSb, InPAs, InPSb, and a mixture thereof; or a quaternary compound selected from GaAlNAs, GaAlNSb, GaAlPAs, GaAlPSb, GaInNP, GaInNAs, GaInNSb, GaInPAs, GaInPSb, GaAlNP, InAlNP, InAlNAs, InAlNSb, InAlPAs, InAlPSb, and a mixture thereof, may be employed. For the group IV-VI compound, a binary compound selected from SnS, SnSe, SnTe, PbS, PbSe, PbTe, and a mixture thereof; a ternary compound selected from SnSeS, SnSeTe, SnSTe, PbSeS, PbSeTe, PbSTe, SnPbS, SnPbSe, SnPbTe, and a mixture thereof; or a quaternary compound selected from SnPbSSe, SnPbSeTe, SnPbSTe, and a mixture thereof, may be employed. For the IV group element, Si, Ge, or a mixture thereof may be selected. For the IV group compound, a binary compound selected from SiC, SiGe, and a mixture thereof may be employed.

In this case, the binary compound, the ternary compound, or the quaternary compound may exist in a uniform concentration or in a partially different concentration in particles.

The quantum dot may include multiple quantum dots, and each of the quantum dots may have a core/shell structure in which one quantum dot (shell) surrounds another quantum dot (core). An interface between a core and a shell may have a concentration gradient such that a concentration of an element in the shell decreases toward a center thereof.

The quantum dot may have a full width at half maximum (FWHM) of the light-emitting wavelength spectrum that is equal to or less than about 45 nm, preferably equal to or less than about 40 nm, and more preferably equal to or less than about 30 nm, and in this range, color purity or color reproducibility may be increased. In addition, since light emitted through the quantum dot is emitted in all directions, a viewing angle of light may be increased.

The quantum dot may have various shapes known in the art, for example, the quantum dot may have a shape such as a nanoparticle having a spherical shape, a pyramid shape, a multi-arm shape, or a cubic shape, or may be a nanotube, a nanowire, a nanofiber, a planar nanoparticle, etc.

The red phosphor may include at least one of (Ca, Sr, Ba)S, (Ca, Sr, Ba)$_2$Si$_5$N$_8$, CaAlSiN$_3$, CaMoO$_4$, and Eu$_2$Si$_5$N$_8$, but other phosphors may alternatively be used.

The green phosphor may include at least one of yttrium aluminum garnet (YAG), (Ca, Sr, Ba)$_2$SiO$_4$, SrGa$_2$S$_4$, barium magnesium aluminate (BAM), α-SiAlON, β-SiAlON, Ca$_3$Sc$_2$Si$_3$O$_{12}$, Tb$_3$Al$_5$O$_{12}$, BaSiO4, CaAlSiON, and (Sr1–xBax)Si$_2$O$_2$N$_2$. In this case, the x may be a number between 0 and 1.

The transmission portion 330B may include the first region 330B_1 adjacent to the liquid crystal layer 3 and the second region 330B_2 adjacent to the first passivation layer 321.

The second region 330B_2 may include a convex portion 330B_2a corresponding to the recess portion 321a of the first passivation layer 321, similar to the aforementioned blue light blocking filter 325. The second region 330B_2 may include a convex portion 330B_2a which faces the second substrate 310. Total reflection of light may be reduced at an interface between the second region 330B_2 and the first passivation layer 321, and an amount of light emitted to the outside of the second substrate 310 may increase.

The transmission portion 330B may allow light emitted from the light unit 500 and introduced into the transmission portion 330B to pass therethrough. The transmission portion 330B may include a polymer material that allows blue light supplied from the light unit 500 to pass therethrough. The transmission portion 330B disposed in a region for emitting blue light may pass the introduced blue light without a separate phosphor or quantum dot.

According to exemplary embodiments of the present invention, the first region 330B . . . 1 may include a scatterer 332, and the second region 330B_2 might not include the scatterer 332. The scatterer 332 may scatter light introduced into the first region 330B_1 of the transmission portion 330B so as to increase an amount of emitted light or make front luminance and side luminance more uniform. For example, the scatterer 332 may include at least one of TiO$_2$, Al$_2$O$_3$, and SiO$_2$, or an alternative scattering material. According to exemplary embodiments of the present invention, the second region 330B_2 does not include the scatterer 332, thereby preventing light from being returned to the liquid crystal layer immediately before being emitted. Accordingly, the amount of light emitted to the outside of the second substrate 310 may be increased. In addition, according to an exemplary embodiment of the present invention, the first color conversion portion 330R and/or the second color conversion portion 330G may include the scatterer 332.

According to exemplary embodiments of the present invention, the first color conversion portion 330R and the second color conversion portion 330G may include the scatterer 332 having substantially a same central diameter. The scatterer 332 included in the transmission portion 330B may have a central diameter that is smaller than those of the first color conversion portion 330R and second color conversion portion 330G. As used herein, "central diameter" indicates an average value of diameters of a plurality of scatterers 332 included in the color conversion portions 330R and 330G or the transmission portion 330B, and the diameters of the scatterers 332 may achieve a Gaussian distribution.

For example, the first color conversion portion 330R and the second color conversion portion 330G may each include the scatterer 332 having a central diameter of about 200 to 220 nm, and the transmission portion 330B may include the scatterer 332 having a central diameter of about 170 to 190 nm. In addition, volume fractions of the scatterers 332 included in the first color conversion portion 330R and the second color conversion portion 330G may be substantially the same, and the volume fraction of the scatterer 332 included in the transmission portion 330B may be greater than that of the scatterer 332 included in the first color conversion portion 330R or the second color conversion portion 330G. For example, the volume fraction of the scatterer 332 included in the transmission portion 330B is substantially the same as a sum of the volume fractions of the first semiconductor nanocrystal 331R of the first color conversion portion 330R and the scatterer 332 included in the first color conversion portion 330R. Alternatively, the volume fraction of the scatterer 332 included in the transmission portion 330B is substantially the same as a sum of the volume fractions of the second semiconductor nanocrystal 331G of the second color conversion portion 330G and the scatterer 332 included in the second color conversion portion 330G.

The first region 330B_1 may have a similar composition to the second region 330B_2, except for the inclusion of the scatterer 332. FIG. 2 illustrates the first region 330B_I and the second region 330B_2 which are disposed at different layers, but the present specification is not limited thereto. For example, they may be provided as one layer.

The transmission portion 330B may further include a blue pigment and/or a dye. The blue pigment and the dye may absorb at least one of red light and green light included in external light to thereby prevent color reproducibility deterioration.

A capping layer 340 may be disposed between the first color conversion portion 330R, the second color conversion portion 330G, the transmission portion 330B, and the liquid crystal layer 3. The capping layer 340 may overlap a front surface of the second substrate 310.

The capping layer 340 may increase light-emitting efficiency by reflecting light generated from the first color conversion portion 330R and the second color conversion portion 330G.

The capping layer 340 may include a plurality of optical filter layers, and the capping layer may have a structure in which layers having different refractive indexes are alternately arranged along a direction substantially perpendicular to the plane of the second substrate 310. The capping layer 340 may be formed by alternately arranging the layers having different refractive indexes and may include a multilayer structure of about 10 to 20 layers, but other configurations may be used. The capping layer 340 may have a structure in which a silicon oxide (SiOx) film and a silicon nitride (SiNy) film are alternately arranged, but other configurations may be used. For example, a titanium oxide, a tantalum oxide, a hafnium oxide, and/or a zirconium oxide may be used as a material having a relatively high refractive index, and SiCOz may be used as a material having a relatively low refractive index. In the SiOx, SiNy, and SiCOz, x, y, and z as factors determining the chemical composition ratio may be controlled depending on process conditions when forming the layers.

When a layer of the layers constituting the capping layer 340, which is most adjacent to the first color conversion portion 330R, the second color conversion portion 330G, and the transmission portion 330B, is formed of a silicon nitride film, the silicon nitride film may serve as a passivation layer. The capping layer 340 may prevent the first color conversion portion 330R, the second color conversion portion 330G, and the transmission portion 330B from being damaged during the manufacturing processes. The semiconductor nanocrystals included in the first color conversion portion 330R and the second color conversion portion 330G may be damaged or quenched by moisture and high-temperature processes. The silicon nitride film may prevent this problem.

A planarization layer 350 is disposed between the capping layer 340 and the liquid crystal layer 3. The planarization layer 350 may serve to planarize a surface of a constituent element disposed between the planarization layer 350 and the second substrate 310.

A second polarization layer 22 may be disposed between the planarization layer 350 and the liquid crystal layer 3. The second polarization layer 22 serves to polarize light passing through the light unit 500, the lower display panel 100, and the liquid crystal layer 3.

A coated polarization layer, a film polarization layer, a wire grid polarizer, or the like may be used as the second polarization layer 22. The second polarization layer 22 may include a metal.

The polarization layer 22 may include a plurality of bar-like nanopatterns according to an exemplary embodiment of the present invention, and a width of each nanopattern may be several nanometers.

An insulating layer 360, a common electrode 370, and a second alignment layer 21 may be sequentially disposed between the second polarization layer 22 and the liquid crystal layer 3.

The insulating layer 360 may isolate the second polarization layer 22 made of metal from the common electrode 370. When the second polarization layer 22 is not made of metal, the insulating layer 360 may be omitted.

The common electrode 370 receiving a common voltage may form an electric field together with the pixel electrode 191. According to some exemplary embodiments of the present invention, the common electrode 370 may be disposed in the lower display panel 100.

The second alignment layer 21 may include a same material as the first alignment layer 11, and may be manufactured through a same process.

The above-described display device can provide light with increased color purity by including the light unit 500 for providing blue light and the color conversion portions 330R and 330G for emitting red and green light therethrough. In addition, since the second polarization layer 22 included in the color conversion display panel 30 is relatively thin, e.g. on the order of several nanometers, a path through which light passes is short to minimize light distortion.

Further, when total reflection may be reduced by allowing light passing through the color conversion portions 330R and 330G and the transmission portion 330B to pass through a concave or convex interface, the amount of light emitted to the outside of the second substrate 310 may increase.

Hereinafter, a display device according to an exemplary embodiment of the present invention will be described with reference to FIG. 3 to FIG. 7. FIG. 3, FIG. 4, FIG. 5, FIG. 6, and FIG. 7 are cross-sectional views that illustrate a modification of what is illustrated in FIG. 2.

Figure 3:
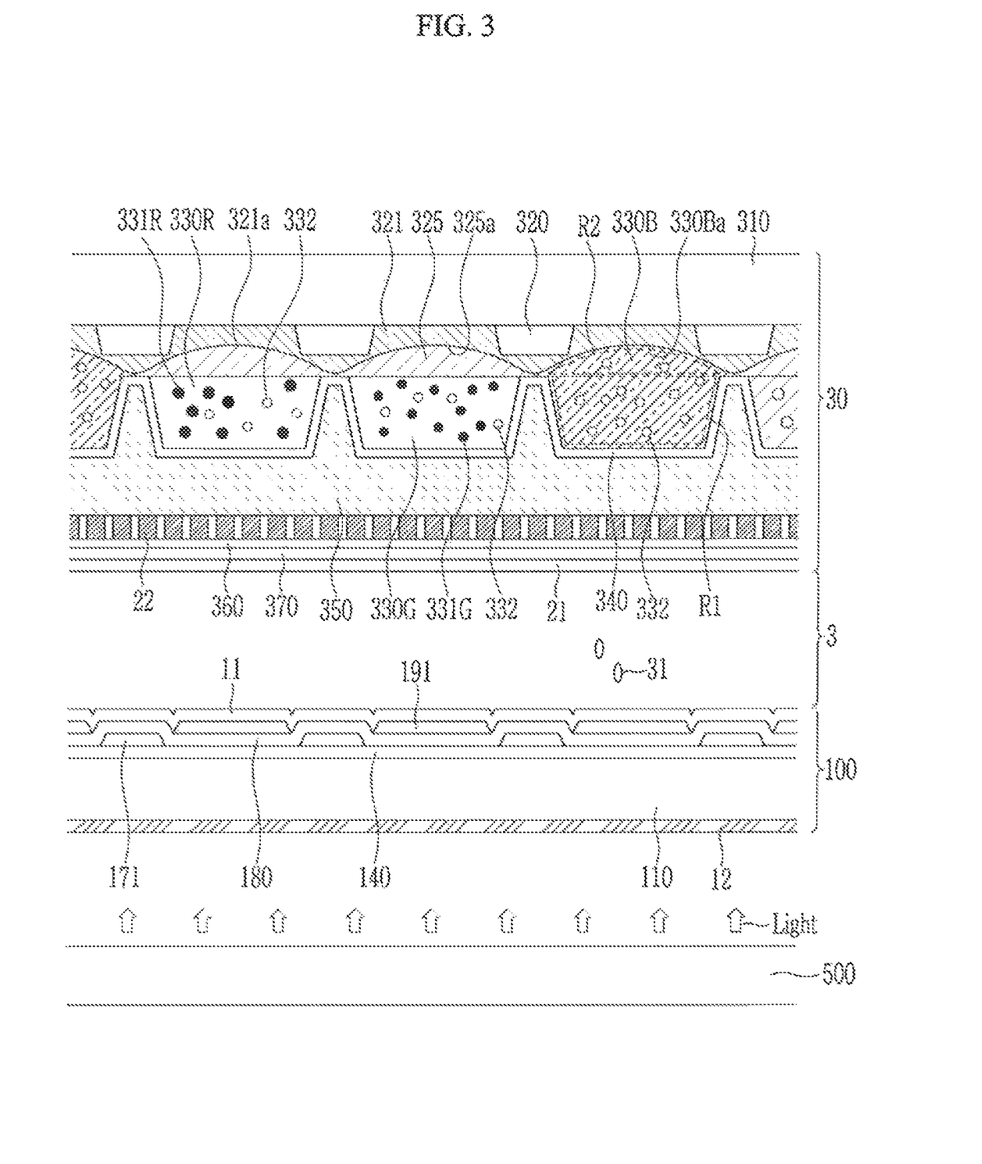
FIG. 3 is a cross-sectional view taken along a line II-II' of FIG. 1 according to an exemplary embodiment of the present invention.

First, referring to FIG. 3, the first color conversion portion 330R and the second color conversion portion 330G may be disposed between the blue light blocking filter 325 and the liquid crystal layer 3, and the transmission portion 330B may be disposed between the second substrate 310 and the lower display panel 100.

The transmission portion 330B may include a convex portion 330Ba that faces the second substrate 310. The convex portion 330Ba included in the transmission portion 330B may have a complementary shape to that of the recess portion 321a of the first passivation layer 321.

The present specification has described the exemplary embodiment in which the convex portion 330Ba of the transmission portion 330B directly contacts the recess portion 321a of the first passivation layer 321, but the present invention is not limited thereto. For example, a buffer layer or the like may be disposed between the transmission portion 330B and the recess portion 321a.

The transmission portion 330B may include the scatterer 332, and may include a first region R1 that at least partially overlaps the color conversion portions 330R and 330G along a first direction and a second region R2 including the convex portion 330Ba.

The transmission portion 330B may allow light emitted from the light unit 500 and introduced into the transmission portion 330B to pass therethrough. The transmission portion 330B may include a polymer material that allows blue light supplied from the light unit 500 to pass therethrough. The transmission portion 330B is positioned in a region for emitting blue light without a separate phosphor or quantum dot.

The first region R1 and the second region R2 of the transmission portion 330B may include the scatterer 332. The scatterer 332 may be disposed in a region where the convex portion 330Ba is disposed. A volume fraction of the scatterer 332 included in the first region R1 may be greater than that of the scatterer 332 included in the second region R2. For example, the volume ratio of the scatterer 332 may decrease from the first region R1 to the second region R2, and the second region R2 might not include the scatterer 332.

The scatterer 332 may scatter light introduced into the transmission portion 330B so as to increase an amount of emitted light or make front luminance and side luminance more uniform.

The description of other constituent elements may be at least similar to that of the elements described above with reference to FIG. 1 and FIG. 2, and thus the description thereof will be omitted hereinafter.

Figure 4:
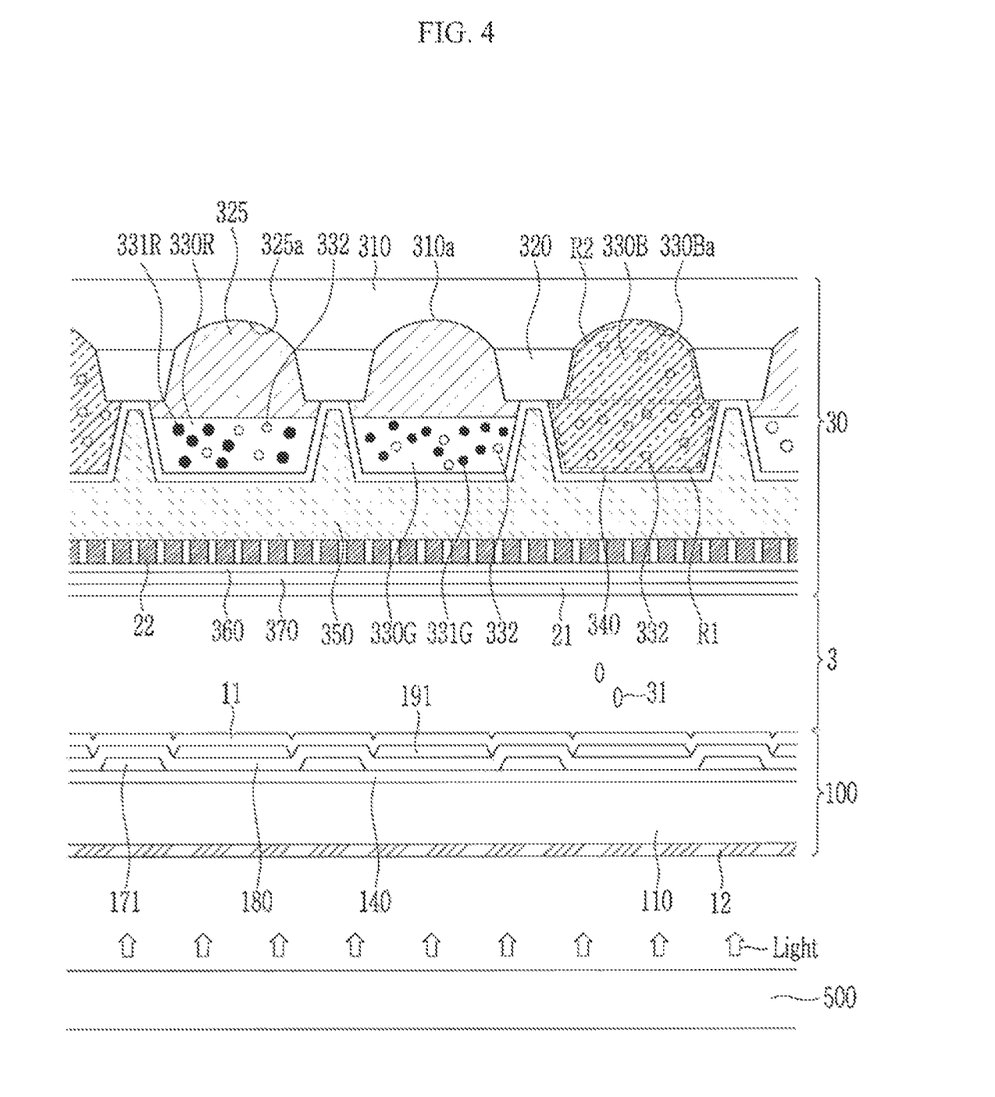
FIG. 4 is a cross-sectional view taken along a line II-II' of FIG. 1 according to an exemplary embodiment of the present invention.

Next, referring to FIG. 4, the second substrate 310 may include a plurality of recess portions 310a. For example, the recess portions 310a may be disposed in a surface of the second substrate 310 which faces the liquid crystal layer 3. The recess portions 310a may be regularly arranged at a constant distance.

According to an exemplary embodiment of the present invention, one recess portion 310a may be disposed to correspond to one pixel, but the present specification is not limited thereto. In addition, the recess portions 310a disposed adjacently may be connected to each other, or may be spaced apart from each other. Further, although the present specification has described the recess portions 310a having a constant curvature, the recess portions 310a may alternatively have an irregular curvature.

In general, where light is introduced from a first material having a relatively large refractive index to a second material having a relatively small refractive index, light is totally reflected the interface between the first material and the second material when an incidence angle is greater than a particular angle. Light passing through the transmission portion 330B or the blue light blocking filter 325 is introduced into the second substrate 310. In this case, the transmission portion 330B or the blue light blocking filter 325 has a refractive index that is greater than that of the second substrate 310. Accordingly, total reflection may occur for light that is introduced at a critical angle or more at the interface.

According to an exemplary embodiment of the present invention, an incidence angle of light becomes different at an interface of the recess portion 310a, and thus a total reflection problem caused by a refractive index may be reduced. Light efficiency of the display device may be increased by emitting light that is not able to be emitted to the outside of the second substrate 310 toward a user.

The blue light blocking filter 325 may include a plurality of convex portions 325a which face the second substrate 310. The convex portions 325a may be regularly arranged at a constant distance.

The convex portion 325a of the blue light blocking filter 325 and the convex portion 325a of the recess portion 310a may have complementary shapes. The present specification has described the exemplary embodiment in which the blue light blocking filter 325 includes the convex portion 325a. However, a shape of the convex portion 325a included in the blue light blocking filter 325 may be changed depending on a shape of the recess portion 310a included in the second substrate 310.

Similar to the recess portion 310a, one convex portion 325a may be disposed to correspond to one pixel In addition, the convex portions 325a disposed adjacently may be connected to each other, or may be spaced apart from each other. Further, although the present specification has described the convex portions 325a having a constant curvature, the convex portions 325a may alternatively have irregular curvatures.

The transmission portion 330B may include a convex portion 330Ba that faces the second substrate 310. The convex portion 330Ba included in the transmission portion 330B may have a shape that meshes with the recess portion 310a of the second substrate 310. The present specification has described the exemplary embodiment in which the convex portion 330Ba of the transmission portion 330B directly contacts the recess portion 310a of the second substrate 310, but other arrangements may be used. For example, a buffer layer or the like may be disposed between the convex portion 330Ba and the recess portion 310a.

It is to be understood that to the extent that constituent elements are not described below, these elements are at least similar in description to corresponding elements that have already been described.

Figure 5:
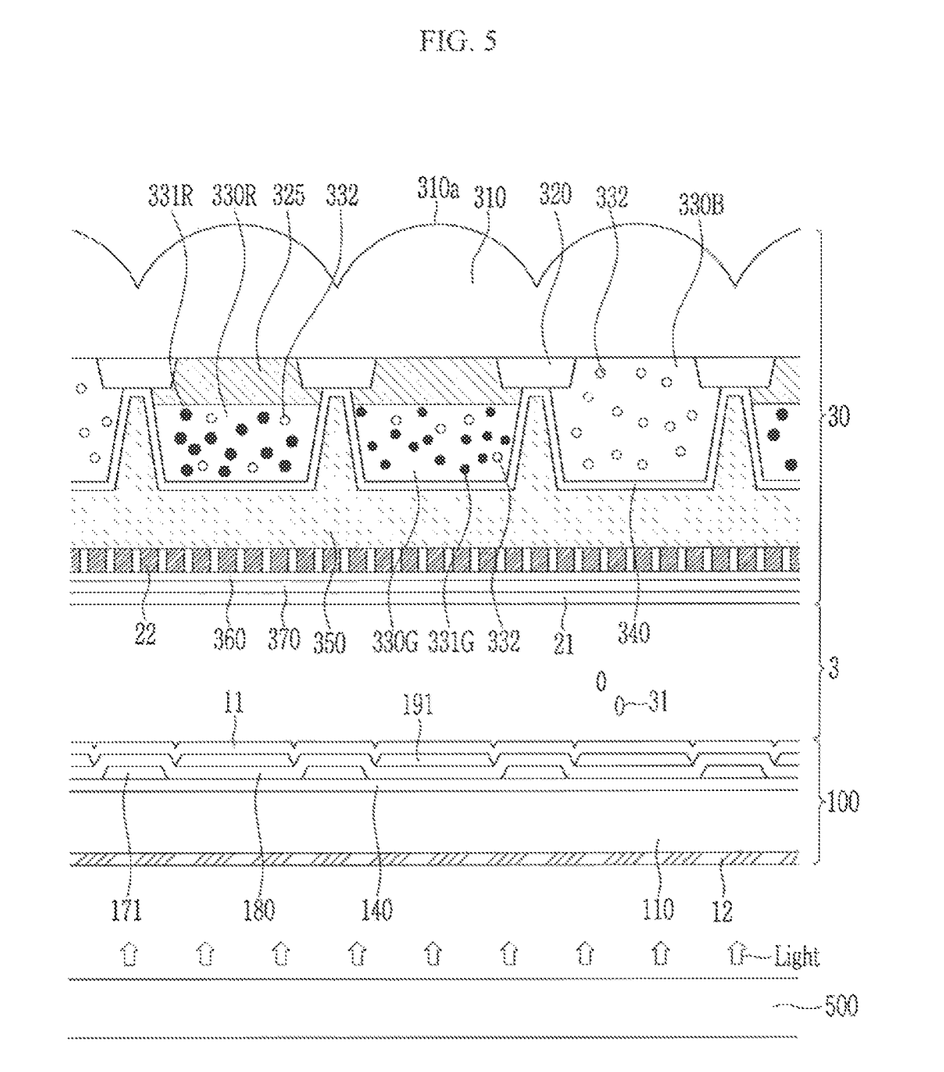
FIG. 5 is a cross-sectional view taken along a line II-II' of FIG. 1 according to an exemplary embodiment of the present invention.

Next, referring to FIG. 5, according to an exemplary embodiment of the present invention, the second substrate 310 may include a plurality of convex portions 310a disposed in a second surface of the liquid crystal layer 3 which faces a first surface of the liquid crystal layer 3. The convex portions 310a may be regularly arranged at a constant distance.

According to an exemplary embodiment of the present invention, one recess portion 310a may be disposed to correspond to one pixel. The recess portions 310a disposed adjacently may be connected to each other, or may be spaced apart from one another. Further, although the present specification has described the recess portion 310a having a constant curvature, the recess portion 310a may alternatively have an irregular curvature.

Light that is introduced from the second substrate 310 having a relatively large refractive index to the air having a relatively small refractive index is totally reflected at the interface therebetween when an incidence angle is greater than a particular angle. However, the color conversion display panel 30, according to exemplary embodiments of the present invention, may include the convex portions 310a formed at the interface between the second substrate 310 and the air, thereby changing an incidence angle of light for the interface to reduce the total reflection. The amount of light emitted to the outside of the substrate 310 may thereby be increased.

Figure 6:
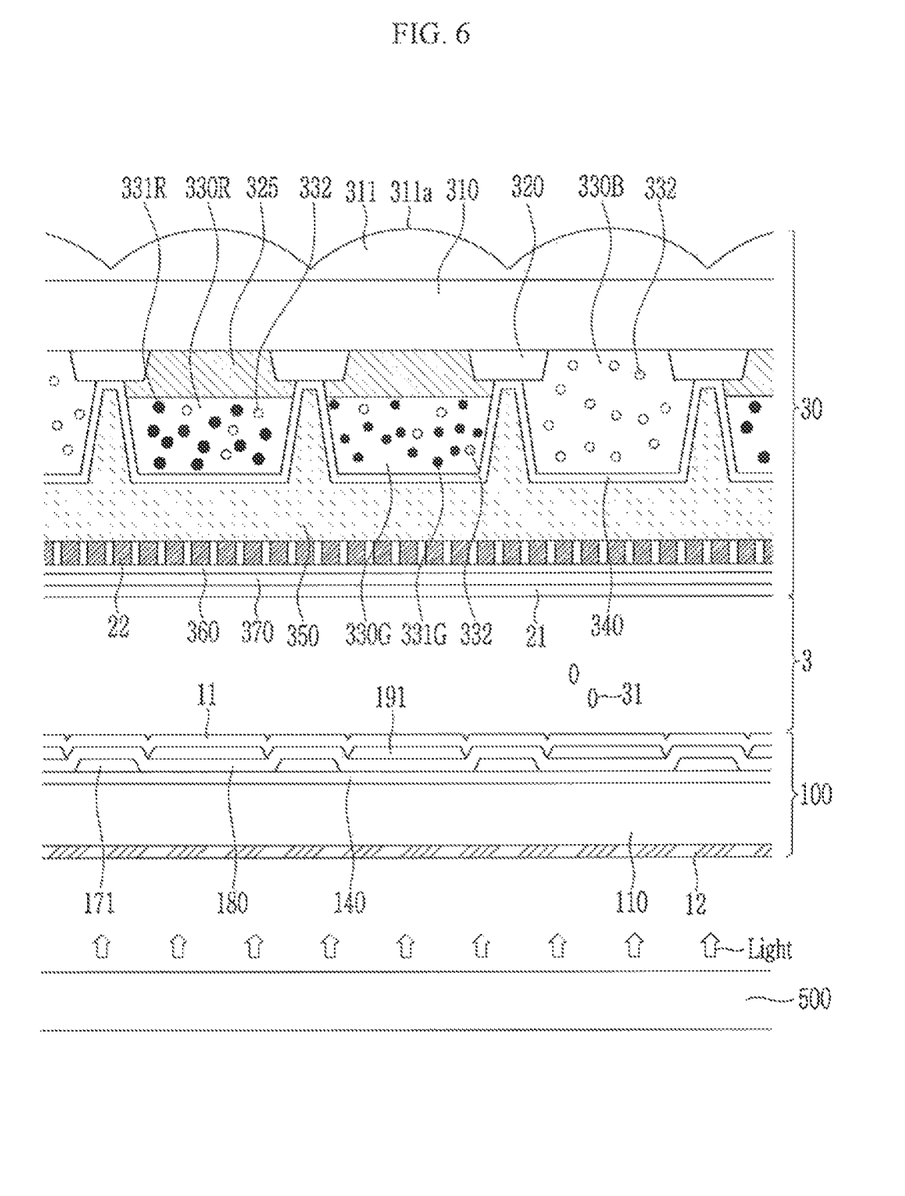
FIG. 6 is a cross-sectional view taken along a line II-II' of FIG. 1 according to an exemplary embodiment of the present invention.

Referring to FIG. 6, the second substrate 310, according to an exemplary embodiment of the present invention, may include a pattern layer 311 disposed in a second surface of the liquid 2) crystal layer 3 which faces a first surface of the liquid crystal layer 3. The pattern layer 311 may include a plurality of convex portions 311a. The convex portions 311a may be regularly arranged at a constant distance.

The pattern layer 311 may be disposed by various manufacturing processes such as by being patterned after being attached or applied in the form of a film on the second substrate 310. The pattern layer 311 may be an embossing sheet including convex portions 311a, or may be a polarization layer or an external light absorbing film including the convex portions 311a.

The pattern layer 311 may include a transmissive material, and may include a material having a lower refractive index than the second substrate 310. For example, the refractive index of the second substrate 310 may be about 1.5, and the pattern layer 311 may include an organic or inorganic material having a lower refractive index.

When light is introduced from the second substrate 310 having a relatively large refractive index to air having a relatively small refractive index, the light is totally reflected at the interface when an incidence angle is greater than a particular angle. However, the color conversion display panel 30, according to an exemplary embodiment of the present invention, may provide a pattern layer 311 disposed at an interface between the second substrate 310 and the air.

The pattern layer may have a refractive index which is between the refractive indexes of the second substrate 310 and the air, thereby changing an incidence angle of light for the interface to reduce the total reflection and an amount of light that is totally reflected. The amount of light emitted to the outside of the second substrate 310 may thereby be increased.

Figure 7:
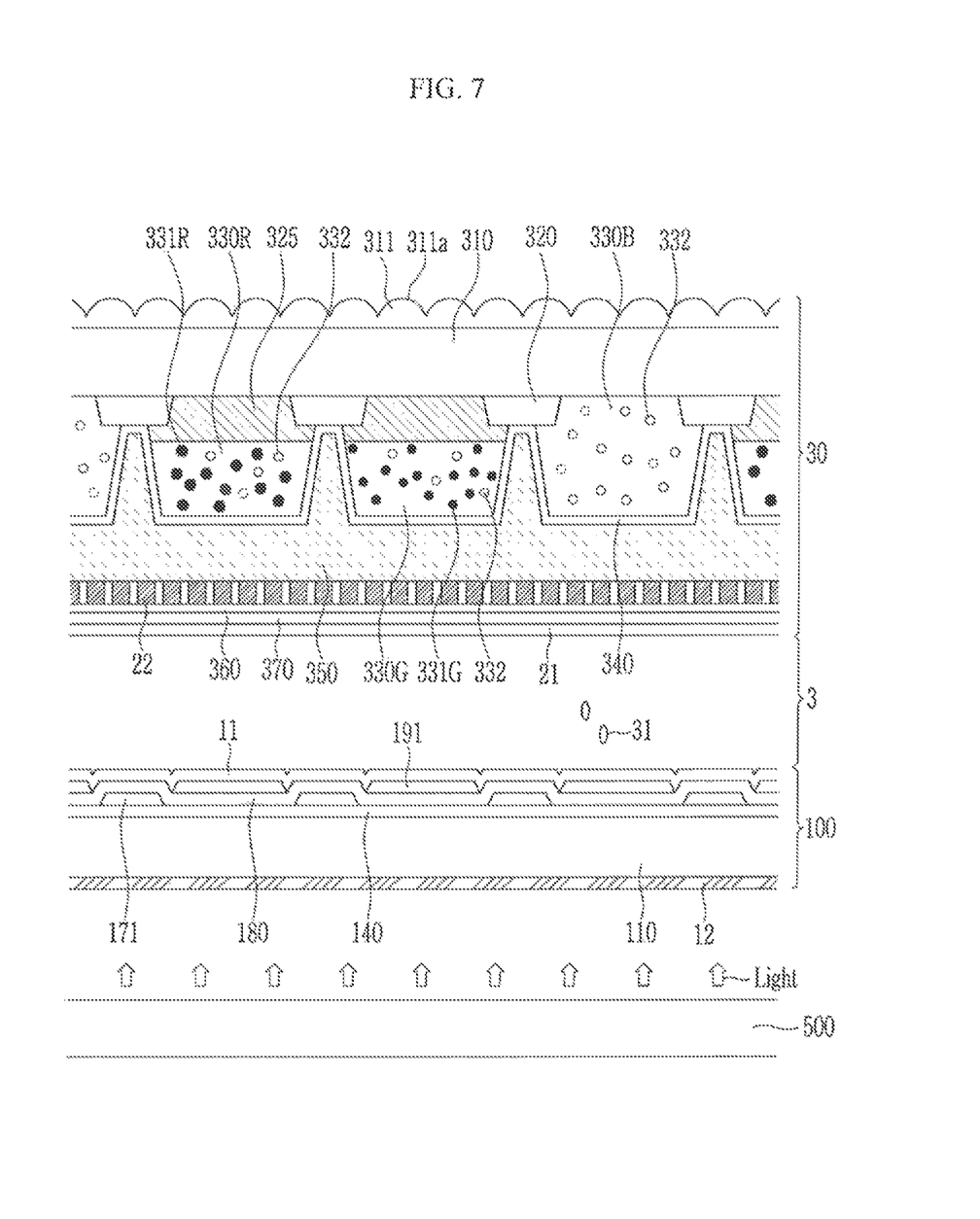
FIG. 7 is a cross-sectional view taken along a line II-II' of FIG. 1 according to an exemplary embodiment of the present invention.

Referring to FIG. 7, the pattern layer 311, according to exemplary embodiments of the present invention, may include a plurality of convex portions 311a corresponding to one pixel. For example, one pixel may overlap at least two convex portions 311a. While it is described herein that one pixel overlaps four convex portions 311a, is the present invention is not limited to this particular arrangement. For example, one pixel may overlap any number of convex portions.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A color conversion display panel, comprising:
    a substrate;
    a first color conversion portion including a first semiconductor nanocrystal;
    a second color conversion portion including a second semiconductor nanocrystal;
    a first transmission portion;
    a low refractive index layer comprising a first low refractive index portion overlapping the first color conversion portion and a second low refractive index portion overlapping the second color conversion portion; and
    a high refractive index layer disposed between the low refractive index layer and the first color conversion portion,
    wherein a refractive index of the substrate is between a refractive index of the high refractive index layer and a refractive index of the low refractive index layer.

2. The color conversion display panel of claim 1, wherein the first low refractive index portion is disposed between the substrate and the first color conversion portion.

3. The color conversion display panel of claim 1, wherein the second low refractive index portion is disposed between the substrate and the second color conversion portion.

4. The color conversion display panel of claim 1, wherein the high refractive index layer comprises a first high refractive index portion and a second high refractive index portion,
    the first high refractive index portion is disposed between the first low refractive index portion and the first color conversion portion, and the second high refractive index portion is disposed between the second low refractive index portion and the second color conversion portion.

5. The color conversion display panel of claim 1, wherein the first high refractive index portion and the second high refractive index portion are parallel to the substrate in a horizontal plane.

6. The display device of claim 5, wherein the first and second high refractive index portions include a same material.

7. The color conversion display panel of claim 1, further comprising
    a light blocking portion disposed between the first low refractive index portion and the second low refractive index portion.

8. The color conversion display panel of claim 1, further comprising a second transmission portion disposed between the substrate and the first transmission portion,
    wherein the first transmission portion includes a scatterer and the second transmission portion does not include the scatterer.

9. The color conversion display panel of claim 1, further comprising a capping layer disposed on the first color conversion portion and the second color conversion portion.

10. The color conversion display panel of claim 9, further comprising a planarization layer disposed on the capping layer.

11. A display device comprising:
    a display panel including a plurality of thin film transistors; and
    a color conversion display panel overlapping the display panel,
    wherein the color conversion display panel includes:
    a substrate overlapping the display panel;
    a first color conversion portion including a first semiconductor nanocrystal;
    a second color conversion portion including a second semiconductor nanocrystal;
    a first transmission portion;
    a low refractive index layer comprising a first low refractive index portion overlapping the first color conversion portion and a second low refractive index portion overlapping the second color conversion portion; and
    a high refractive index layer disposed between the low refractive index layer and the first color conversion portion,
    wherein a refractive index of the substrate is between a refractive index of the high refractive index layer and a refractive index of the low refractive index layer.

12. The display device of claim 11, wherein the first low refractive index portion is disposed between the substrate and the first color conversion portion.

13. The display device of claim 11, wherein the second low refractive index portion is disposed between the substrate and the second color conversion portion.

14. The display device of claim 11, wherein the high refractive index layer comprises a first high refractive index portion and a second high refractive index portion,
    the first high refractive index portion is disposed between the first low refractive index portion and the first color conversion portion, and the second high refractive index portion is disposed between the second low refractive index portion and the second color conversion portion.

15. The display device of claim 11, wherein the first high refractive index portion and the second high refractive index portion are parallel to the substrate in a horizontal plane.

16. The display device of claim 15, wherein the first and second high refractive index portions include a same material.

17. The display device of claim 11, further comprising
    a light blocking portion disposed between the first low refractive index portion and the second low refractive index portion.

18. The display device of claim 11, further comprising a second transmission portion disposed between the substrate and the first transmission portion, wherein the first transmission portion includes a scatterer and the second transmission portion does not include the scatterer.

19. The display device of claim 11, further comprising a capping layer disposed on the first color conversion portion and the second color conversion portion.

20. The display device of claim 19, further comprising a planarization layer disposed on the capping layer.

21. A color conversion display panel, comprising:
a substrate;
a first color conversion portion including a first semiconductor nanocrystal;
a second color conversion portion including a second semiconductor nanocrystal;
a low refractive index layer overlapping the first color conversion portion and the second color conversion portion; and
a high refractive index layer disposed between the low refractive index layer and the first color conversion portion,
wherein a refractive index of the substrate is between a refractive index of the high refractive index layer and a refractive index of the low refractive index layer.

* * * * *